United States Patent [19]
Duong

[11] Patent Number: 5,717,582
[45] Date of Patent: Feb. 10, 1998

[54] SELECTIVELY CONTROLLED ELECTRICAL POWER SWITCHING SYSTEM

[75] Inventor: Tuan Anh Duong, Burtonsville, Md.

[73] Assignee: The United States of America as represented by the Secretary of the Navy, Washington, D.C.

[21] Appl. No.: 613,744

[22] Filed: Feb. 22, 1996

[51] Int. Cl.$^6$ ..................................... H02M 7/44
[52] U.S. Cl. .............................. 363/95; 323/222
[58] Field of Search .................. 363/95, 96, 97, 363/98, 132; 323/222, 261, 263

[56] References Cited

U.S. PATENT DOCUMENTS 5,130,917  7/1992  Shekhawat ......................... 363/56
5,402,053  3/1995  Divan et al. ....................... 318/768
5,477,131  12/1995  Gegner ............................. 323/222
5,594,634  1/1997  Rajashekara et al. ............. 363/98

Primary Examiner—Peter S. Wong
Assistant Examiner—Rajnikant B. Patel
Attorney, Agent, or Firm—John Forrest; Jacob Shuster

[57] ABSTRACT

Electrical energy from a DC voltage source is supplied through a power switching converter under operational control, to an electrical load in accordance with a soft-switching mode implemented by an auxiliary resonant commutated pole inverter. A mode control section having snubber switches connected to the switching converter selectively changes switching operation to a hard-switching mode so as to accommodate supply of load current at higher levels to the electrical load.

12 Claims, 2 Drawing Sheets

5,717,582

SELECTIVELY CONTROLLED ELECTRICAL POWER SWITCHING SYSTEM

This invention relates in general to electrical power switching circuitry, and more particularly to such circuitry having a selective operational capability so as to accommodate different types of electrical loads.

BACKGROUND OF THE INVENTION

Electrical power switching circuits are generally available to respectively provide different operational modes, including hard-switching and soft-switching. The hard-switching mode involves a snubbering technique, widely implemented through low or medium power converters to achieve circuit simplification and obtain low cost effectiveness. However, hard-switching operation of such circuits becomes less desirable because of high switching loss as power level and switching frequency increases. Soft-switching or zero voltage switching on the other hand was developed to reduce switching loss, but involves increased circuit complexity and cost as well as operational inadequacy under low level load current conditions.

Direct current electrical power supply circuitry having selective operational switching controls are also known as disclosed for example in U.S. Pat. Nos. 5,030,844 and 5,391,928 to Li et al. and Tomiyori et al., respectively. However, the circuits disclosed in the foregoing patents do not include or suggest mode control to alternatively provide for both hard-switching and soft-switching operations.

It is therefore an important object of the present invention to provide a selective switching control for supply of electrical current alternatively conducted to a load under either a hard-switching mode or a soft-switching mode in order to accommodate different load conditions in a more efficient and less costly manner.

SUMMARY OF THE INVENTION

In accordance with the present invention, the electrical configuration of an electrical power converter circuit is automatically changed under selective control through a switching converter between soft-switching and hard-switching operational modes. The power converter circuit features an auxiliary circuit section in the form of a resonant commutated pole inverter having auxiliary switches. During start-up, one of two snubber switches of a mode control section may be actuated after a main power switch in the switching converter is gated on or off to select and implement different switching modes.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawings wherein.

DETAILED DESCRIPTION OF PREFERRED EMBODIMENT

Figure 1:
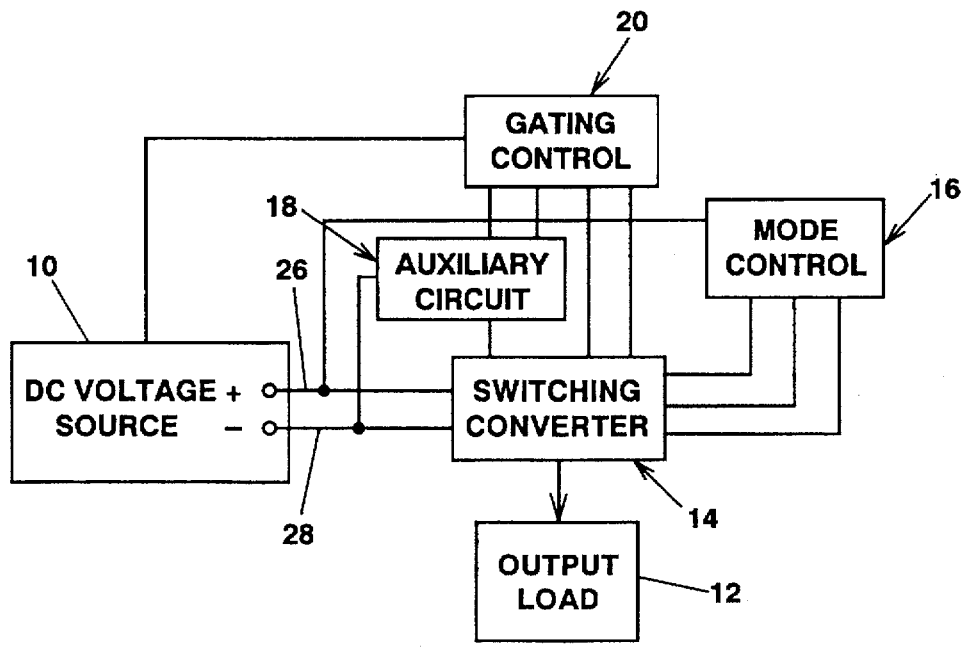
FIG. 1 is a block diagram of a power supply circuit system in accordance with one embodiment of the invention.

Referring now to the drawing in detail, FIG. 1 diagrams the supply of electrical power from a DC voltage source 10 to an output load 12 through a power switching converter generally referred to by reference numeral 14, which operates either under a soft-switching mode or a hard-switching mode dependent on selective control exercised thereon through a mode control arrangement generally referred to by reference numeral 16. Soft-switching operation of the switching converter 14 is made feasible under low current levels by means of an auxiliary circuit 18 associated therewith. Dependent on mode selection, voltage level and other factors or conditions associated with the type of output load 12 to be powered, a suitable operational sequence is imposed on the switching converter 14 and its auxiliary circuit 18 by means of gating control 20 as hereinafter described.

Figure 2:
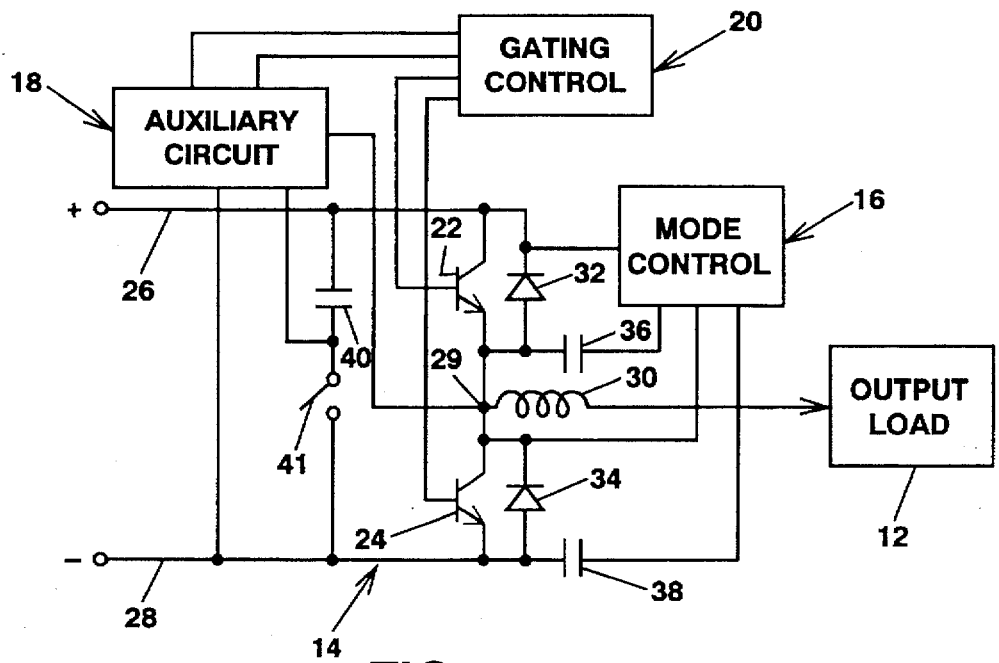
FIG. 2 is a circuit diagram illustrating the switching converter section of the system depicted in FIG. 1.

As diagrammed in FIG. 2, the switching converter 14 includes a pair of main transistor switches 22 and 24 connected in series between positive dc voltage bus 26 and negative dc voltage bus 28 extending from the voltage source 10. A series connection or puncture 29 between the main switches 22 and 24 is coupled by inductor winding 30 to the output load 12. Thus, electrical power is alternatively supplied to the load 12 from the dc voltage buses 26 and 28 by turn-on and turn-off of the switches 22 and 24 in accordance with sequence control signals applied to their gate electrodes by the gating control 20 to obtain a desired switching sequence. Current conducted through the main switches 22 and 24 during supply of power is unidirectionally restricted by diodes 32 and 34 respectively connected across the input and output transistor electrodes of the main switches 22 and 24. Also connected across the input and output electrodes of each switch 22 and 24, respectively in series with resonant capacitors 36 and 38, is the mode control 16 through which the switching mode is governed in conjunction with the auxiliary circuit 18 directly connected to the negative dc voltage bus 28 and coupled through capacitor 40 to the positive dc voltage bus 26. The auxiliary circuit 18 is disabled by closing of by-pass switch 41 selectively connecting capacitor 40 to the bus 28.

Figure 3:
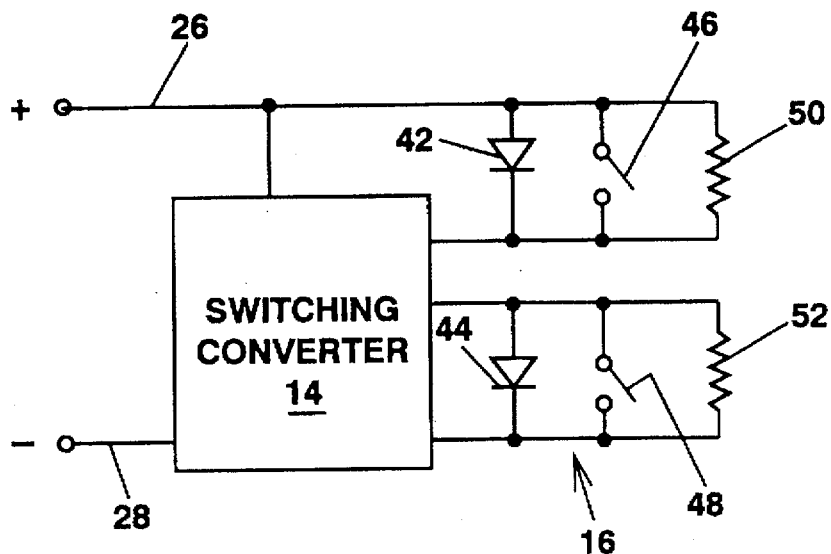
FIG. 3 is a circuit diagram illustrating the mode control section of the system depicted in FIG. 1.

FIG. 2 diagrams the mode control 16 directly connected to the positive voltage bus 26 to which the input electrode of transistor switch 22 is connected. The mode control 16 is also coupled through capacitor 38 to the input electrode of diode 34 and the negative voltage bus 28. The diodes 32 and 34 are thereby respectively connected across directionally opposite diodes 42 and 44 of the mode control 16 as shown in FIG. 3. Each of such diodes 42 and 44 is connected across a snubber circuit, respectively formed by switches 46 and 48 in parallel with resistors 50 and 52. Thus, when both of the snubber switches 46 and 48 of the mode control 16 are opened and the auxiliary circuit 18 is disabled upon closing of switch 41, the switching converter 14 performs a hard-switching operation under sequence gate control of the main transistor switches 22 and 24 for supply of electrical energy to the load 12 at lower power levels and at lower frequencies.

Figure 4:
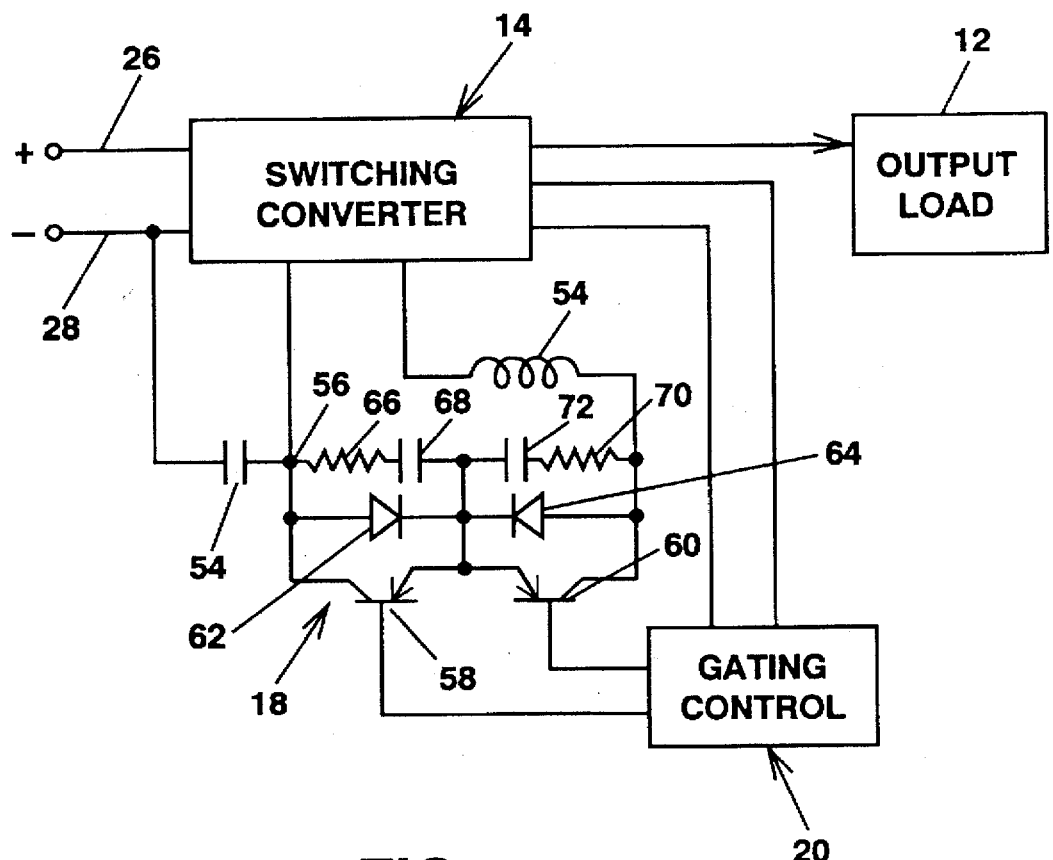
FIG. 4 is a circuit diagram illustrating the auxiliary circuit section of the system depicted in FIG. 1.

The auxiliary circuit 18 as diagrammed in FIG. 4 is coupled to the load 12 through inductance winding 52 in series with the winding 30 of the converter 14. The capacitor 40 of converter 14 on the other hand is connected across the buses 26 and 28 in series with a capacitor 54 through a junction 56 in the auxiliary circuit 18. Acting as an auxiliary resonant commutated pole inverter, the circuit 18 includes a pair of auxiliary transistor switches 58 and 60 connected in series between junction 56 and the inductance 54. Such transistor switches 58 and 60 have control gate electrodes connected to the gating control 20 for energy storage reset purposes. Directionally opposite diodes 62 and 64 are respectively connected across the switches 58 and 60. The diode 62 is also connected in parallel with series connected resistor 66 and capacitor 68, while the diode 64 is connected in parallel with series connected resistor 70 and capacitor 72. When one of the transistor switches 22 and 24 of the converter 14 is gated on and the other gated off pursuant to a sequence imposed by gating control 20, inductive load current is transferred to both resonant capacitors 36 and 38 which are operative to swing voltage supply from one input voltage bus to the other under zero voltage soft-switching through the main switches 22 and 24. At low level load current, such soft-switching is made possible by the auxiliary transistor switches 58 and 60 of the circuit 18 resetting the charge stored in the resonant capacitors 36 and 38 of the switching converter 14.

The snubber resistors 50 and 52 and snubber switches 46 and 48 of the mode control 16 provide for selection between the aforementioned soft and hard switching operations. Soft switching made possible below a predetermined current level by auxiliary circuit 18 as aforementioned, requires one of the main switches 22 and 24 of the switching converter 14 to be gated on by gating control 20 before dc voltage is applied from source 10. During start-up of such soft-switching operation, one of the snubber switches 46 and 48 may be opened before turn-on of one of the main switches 22 and 24 so that charging and discharging of the DC capacitor 40 is not required. When said one of the main transistor switches 22 and 24 is then gated on, a normal soft-switching control sequence is implemented to especially accommodate frequent start and stop operations. Operation in a hard-switching mode under low current levels may also be accommodated by disabling the auxiliary circuit 18 as aforementioned.

In regard to start up of a power switching converter in a soft-switching mode, additional circuitry was heretofore required to perform the time consuming functions of slowing charge of the DC bus capacitor to a target voltage level following its complete discharge before one of the main switches is gated on such operations were performed in order to avoid damage caused by discharge of the resonant capacitors associated with the power switching circuit, and involved higher power losses. Such problems are avoided according to the present invention by selection of a hard-switching mode for the power switching circuit 14 during initial start up by gating off one of the mode selector switches 46 and 48 of the mode control section 16 and limiting current discharge from the resonant capacitors 36 and 38 through resistors 50 and 52. When a main power switch 22 or 24 is gated on, the mode selector switch 46 or 48 may be gated on before implementing a normal soft-switching mode.

Obviously, other modifications and variations of the present invention may be possible in light of the foregoing teachings. For example, the mode selector switches 46 and 48 may be mechanical switches with electrical actuator or semiconductor switches. It is therefore to be understood that within the scope of the appended claims the invention may be practiced otherwise than as specifically described.

What is claimed is:

1. In combination with an electrical power source from which load current is conducted to an electrical load inductively coupled to a switching circuit having resonator capacitors within which energy is stored during supply of the load current through a switching converter, the improvement residing in: mode control means operatively connected to said capacitors and the switching converter for selectively changing operation of the switching circuit from a soft-switching mode to a hard-switching mode to accommodate an increase in the load current above a predetermined level.

2. The combination as defined in claim 1 wherein the switching circuit includes an auxiliary circuit acting as a resonant commutated pole inverter that is enabled by the mode control means to implement performance during the soft-switching mode of operation.

3. The combination as defined in claim 2 wherein the mode control means includes a pair of snubber switches operatively connected to the electrical power source through the resonator capacitors and the switching converter of the switching circuit.

4. The combination as defined in claim 3 wherein said electrical power source applies direct current voltage to the switching converter through positive and negative buses from which the load current supplied to the load is derived, with the negative bus being connected to the auxiliary circuit.

5. The combination as defined in claim 1 wherein said electrical power source applies direct current voltage to the switching converter through positive and negative buses from which the load current supplied to the load is derived.

6. The combination as defined in claim 5 wherein the mode control means includes a pair of snubber switches operatively connected across the positive and negative buses of the electrical power source through the resonator capacitors and the switching converter of the switching circuit.

7. The combination as defined in claim 1 wherein the mode control means includes a pair of snubber switches operatively connected to the electrical power source through the resonator capacitors and the switching converter of the switching circuit.

8. In combination with a switching power converter having power switch means undergoing sequential turn on and turn off and circuit control means connected to the switching power converter for achieving said turn on and turn off of the power switch means under substantially zero voltage, said circuit control means including: unidirectional current switch means for selectively disabling performance of said turn on and turn off of the power switch means under the substantially zero voltage; and capacitor means connected to the power switch means for controlling supply of voltage thereto; and switching mode selector means connected to the circuit control means of the switching power converter for changing said sequential turn on and turn off of the power switch means to a hard switching mode when said performance under the substantially zero voltage is disabled by the unidirectional current switch means.

9. The combination as defined in claim 8 wherein the power switch means comprises a pair transistor switches connected in series by a juncture between positive and negative buses of a voltage source from which said supply of voltage is derived; and gating control means connected to said transistor switches for effecting said sequential turn on and turn off with respect to electrical current fed to a load through an inductance connected to the juncture; said capacitor means comprising a pair of resonant capacitors respectively connected to the transistor switches and to the gating control means.

10. The combination as defined in claim 9 wherein said switching mode selector means includes: a pair of snubber switches selectively connecting said resonant capacitors respectively to the positive bus of the voltage source and the juncture between the transistor switches.

11. The combination as defined in claim 8 wherein said switching mode selector means includes a pair of snubber switches connected to the capacitor means and the power switch means of the switching power converter.

12. In combination with a power source of DC voltage applied across positive and negative bus lines connected to a switching converter from which load current is conducted to a load through an inductor, said switching converter including: a pair of power switches; a juncture interconnecting said power switches in series across the bus lines, said load being connected by the inductor to said juncture; and capacitor means for storing energy during supply of the DC voltage from the bus lines to the power switches; the improvement residing in: mode control means connected to the switching converter for selectively changing performance thereof in a soft-switching mode to a hard-switching mode; auxiliary circuit means connected between the juncture and the negative bus line for implementing the performance of the switching converter in the soft-switching mode; and switch means connected to the negative bus line in by-pass relation to the auxiliary circuit means for disabling operation thereof during the hard-switching mode of the switching converter.

* * * * *